United States Patent [19]

Barth

[11] 4,449,873
[45] May 22, 1984

[54] FASTENER FOR ATTACHING ARTICLES TO A PENETRABLE SURFACE

[75] Inventor: Gerald D. Barth, South Elgin, Ill.

[73] Assignee: Illinois Tool Works Inc., Chicago, Ill.

[21] Appl. No.: 352,281

[22] Filed: Feb. 25, 1982

[51] Int. Cl.³ .............................................. F16B 21/00
[52] U.S. Cl. ..................................... 411/341; 411/346
[58] Field of Search .............. 411/340, 341, 342, 343, 411/345, 344, 346, 347, 411, 412, 413, 415, 532, 546

[56] References Cited

U.S. PATENT DOCUMENTS

| | | | |
|---|---|---|---|
| 867,799 | 10/1907 | Cook | 411/346 |
| 2,121,193 | 6/1938 | Hanicke | 411/413 X |
| 2,419,555 | 4/1947 | Fator | 411/413 X |
| 2,696,138 | 12/1954 | Olschwang | 411/341 |
| 2,933,969 | 4/1960 | Huyssen | 411/346 X |
| 3,861,269 | 1/1975 | Laverty | 411/413 |
| 3,935,785 | 2/1976 | Lathom | 411/413 |
| 4,196,883 | 4/1980 | Einhorn | 411/340 X |
| 4,283,986 | 8/1981 | Peterson | 411/340 |
| 4,285,264 | 8/1981 | Einhorn | 411/346 |

FOREIGN PATENT DOCUMENTS

| | | | |
|---|---|---|---|
| 245860 | 7/1963 | Australia | 411/346 |
| 780499 | 8/1957 | United Kingdom | 411/341 |

*Primary Examiner*—Thomas J. Holko
*Assistant Examiner*—Adrian Whitcomb
*Attorney, Agent, or Firm*—Thomas W. Buckman; Donald D. Mondul; David Roche

[57] ABSTRACT

A fastener assembly for attaching articles to a penetrable surface such as drywall material found in the interiors of buildings. The assembly is comprised of a fastener, which fastener has a threaded shank with a pointed end and either a head or a second threaded end and an anchor member piercedly captured by the threaded shank of the fastener. The anchor member is held in a position substantially parallel to the axis of the threaded shank with the pointed end extending beyond the anchor member by a retaining means while the assembly is piercing a surface; as the assembly pierces the surface, the retaining means slips from engagement with the anchor member and, as the anchor member passes through the rear side of the surface penetrated, spring means on the anchor member urge the anchor member to a position substantially oblique to the axis of the threaded fastener. Force applied to the assembly in a direction to withdraw the assembly from the surface brings the anchor member in contact with the inner face of the surface penetrated, this binding action of the anchor member against the inner face of the surface penetrated keeps the anchor member stationary while the threaded fastener is threadedly advanced through the anchor member until the fastener is appropriately positioned for attachment of an article to the surface. The assembly is capable of accomplishing its purpose of fastening articles to the penetrated surface even when a wooden member abuts the inner face of the surface without having to withdraw the assembly and apply a different fastener means to accommodate that wooden member.

5 Claims, 7 Drawing Figures

U.S. Patent May 22, 1984 4,449,873
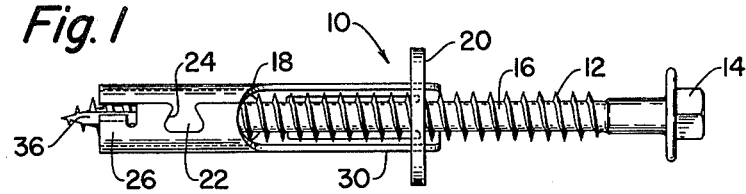
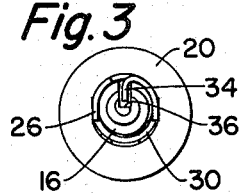
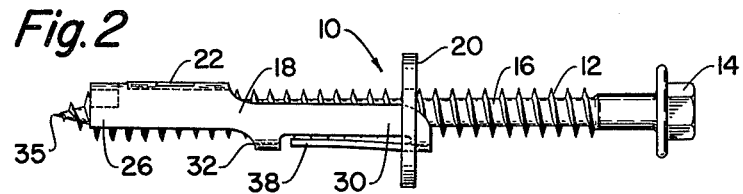
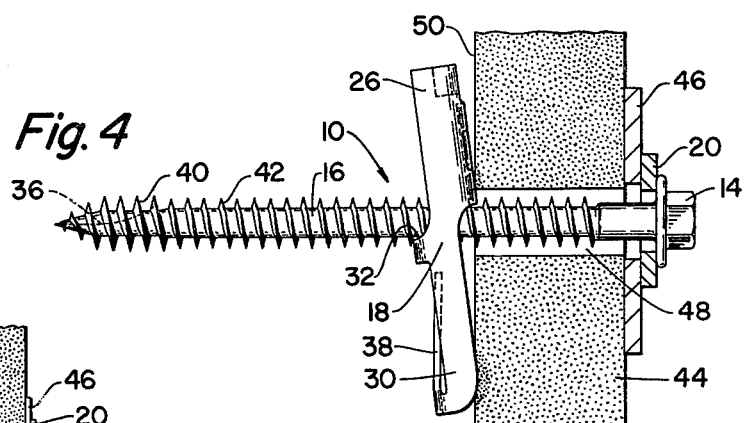
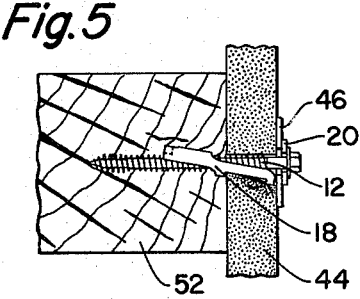
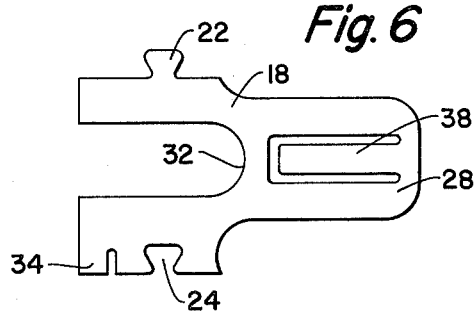
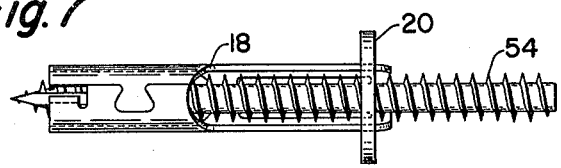

FASTENER FOR ATTACHING ARTICLES TO A PENETRABLE SURFACE

BACKGROUND OF THE INVENTION

Numerous anchors have been devised for anchoring articles to penetrable surfaces such as drywall. Included within the prior art are such approaches as toggle bolts, self-expanding anchors, and butterfly-like expanding anchors. One problem with all of the above approaches to penetrable surface fasteners is that they require pre-drilled holes. Additionally, such fasteners cannot be used in non-hollow sections of the penetrable surface, such as areas of drywall which about a wooden stud.

SUMMARY OF THE INVENTION

This invention relates to fasteners, particularly to fasteners designed to attach articles to penetrable surfaces such as drywall material found in the interiors of buildings.

The invention is a fastener assembly comprised of a fastener, an anchor member, and a retaining means, all of which cooperate to comprise a fastener assembly capable of self-penetration of a surface. The fastener has a threaded shank with a pointed end at its first end and may have a head or a threaded means at its second end for attaching articles to the surface. The anchor member is piercedly captured by the threaded shank and is held in a position substantially parallel to the axis of the threaded shank of the fastener by the retaining means as the fastener penetrates the surface. The pointed end of the threaded shank may extend beyond the anchor member to facilitate piercing the surface. As the fastener assembly pierces and passes through the surface, the retaining means is slipped towards the second end of the fastener; the sides of the hole in the surface serve to maintain the anchor member in a first position substantially in parallel relationship with the axis of the threaded shank of the fastener until the anchor member has passed completely through the surface penetrated. Upon completing passage through the surface, spring means formed as an integral part of the anchor member cooperate to move the anchor member to a second position substantially oblique to the axis of the threaded shank of the fastener. When the anchor member is in the second position, it is threadedly engaged with the threaded shank so that pulling the fastener back through the hole to bring the anchor member in contact with the rear side of the penetrated surface allows threaded advancement of the threaded shank through the anchor member while the anchor member is prevented from rotating with the threaded fastener by the friction of its bearing upon the back side of the penetrated surface. If the surface is of appropriate material, the anchor member partially embeds in the rear side of the surface, further ensuring that it will not rotate as the threaded fastener advances. Enlarged threads at the first end of the threaded fastener preclude the pulling of the fastener free from the anchor member during this binding operation, thereby precluding the anchor member's falling free from the threaded shank and failing to provide support for the fastener.

If in penetrating the surface there is wood encountered behind the surface rather than a hollow space, the fastener and anchor member will simply become embedded in the wood and torque applied to the second end of the fastener will cause the threaded shank to thread into the wood as would be the case with any wood screw in a similar situation. Therefore there is no need in such a situation when wood is encountered to remove the fastener and obtain a different type of fastener to accommodate something other than a hollow space behind the surface.

It is therefore an object of this invention to provide a fastener for attaching articles to a penetrable surface which does not require a pre-drilled hole.

A further object of this invention is to provide a fastener for attaching articles to a penetrable surface which can attach such articles whether a hollow space or a wood-like material is encountered behind the penetrable surface.

Further objects and features of the present invention will be apparent from the following specification and claims when considered in connection with the accompanying drawings illustrating the preferred embodiment of the invention.

DETAILED DESCRIPTION OF THE DRAWINGS

FIG. 1 is a front view of the preferred embodiment of the fastener assembly of the present invention as it would be arranged for penetration of a surface.

FIG. 2 is a side view of FIG. 1.

FIG. 3 is an end view of FIG. 2.

FIG. 4 illustrates the fastener of the present invention upon completion of installation in a hollow penetrable surface.

FIG. 5 illustrates the fastener assembly of the present invention upon completion of installation in a penetrable surface backed by a wooden member.

FIG. 6 shows the stamping from which the anchor member of the present invention is formed.

FIG. 7 shows an alternative embodiment of the fastener assembly shown in FIG.1, with the fastener having a second threaded end.

DETAILED DESCRIPTION OF THE INVENTION

A fastener assembly 10, as shown in FIG. 1, is comprised of a threaded fastener 12 having a head 14 and a threaded shank 16, an anchor member 18, and a retaining means 20.

The anchor member 18 is a stamping as shown in FIG. 6 which is subsequently formed as shown in FIGS. 1-5 to provide an interlocking tab 22, which when interlocked with receptor 24, forms a first embracing portion 26 of an anchor member 18. The body of the stamping 28 is formed to comprise a second embracing portion 30 of the anchor member 18. The first embracing portion 26 and the second embracing portion 30 embrace the threaded shank 16 from substantially opposite directions. The transition point 32 between the first embracing portion 26 and the second embracing portion 30 comprises the single area of the anchor member 18 which completely embraces or surrounds the threaded shank 16. The transition point 32 is sized to threadedly engage the threaded shank 16 for at least a portion of the length of threaded shank 16 when the anchor member 18 is at an oblique angle to the axis of the fastener 12, as shall be discussed in greater detail later. A tab 34 is formed in the stamping of the anchor member 18 as shown in FIG. 6. This tab 34 is proportioned and positioned to fit in a slot 36 in the end of the threaded shank 16 most distal from the head 14 of the fastener 12. The engagement of tab 34 within the slot 36 prevents rotation of the anchor member 18 with respect to the fastener 12, and subsequent advancement of anchor member 18 up the threaded shank 16 toward the head 14 of the fastener 12 as the fastener assembly 10 penetrates a surface. Thus the fastener 12 and the anchor member 18 maintain their relative positions with respect to each other during the process of penetration of a surface. A spring member 38 is stamped in the anchor member 18. The spring member 38 is biased to resist maintenance of the position of the anchor member 18 substantially parallel to the axis of the fastener 12, as shown in FIG. 1.

Referring to FIG. 4, the threaded shank 16 has formed thereon two threaded segments, a first threaded segment 40 and a second threaded segment 42, having differing major diameters, with the first threaded segment 40 having a larger major diameter than the second threaded segment 42. As the fastener assembly 10 is forced through a penetrable surface 44 with the intent of securing an article 46 thereto, the tab 34 and the slot 36 cooperate to maintain the relative positions of the anchor member 18 and the threaded fastener 12 with respect to each other. The anchor member 18 is held in a first position substantially parallel to the axis of the fastener 12 by the retaining means 20, which may be a washer surrounding both the fastener 12 and the anchor member 18. The tip 35 of the threaded shank 16 may extend beyond the anchor member 18 to facilitate penetration of the surface 44. As the retaining means 20 comes in contact with the article 46 its further movement with the fastener assembly 10 is precluded. As the anchor member 18 and the fastener 12, still held in a given relative relationship by the cooperation of tab 34 and slot 36, proceed through the surface 44, the retaining means 20 slips from engagement with the anchor member 18. The hole 48 in the surface 44 continues to maintain the anchor member 18 in the first position substantially parallel to the axis of the fastener 12 until the anchor member 18 passes fully through the surface 44. In the meantime, the retaining means 20 remains between the head 14 and the article 46, ultimately to be securely captured between the head 14 and the article 46. When the anchor member 18 passes fully through the surface 44, thus clearing the hole 48, the spring member 38 is freed to release its kinetic energy thereby imparting a force against the threaded shank 16 and aiding rotation of the anchor member 18 with respect to the threaded shank 16 toward a second position substantially oblique to the axis of the threaded shank 16. To complete installation of the fastener assembly 10 so that article 46 will be securely attached to surface 44, when the anchor member 18 rotates to the second position as shown in FIG. 4, a withdrawing force is applied to the fastener 12 urging the fastener 12 in a direction which would withdraw the fastener 12 through the hole 48. In this manner the anchor member 18 is brought to bear against the inner face 50 of the surface 44. The friction of the anchor member 18 against the inner face 50 as a withdrawing force is applied to the fastener 12 precludes rotation of the anchor member 18 as the fastener 12 is turned to threadedly advance the threaded shank 16 through the transition point 32 of the anchor member 18 until a compressive force is applied to the surface 44 by the anchor member 18 and the head 14 through the retaining means 20 and the article 46. If the surface 44 is of appropriate material, the anchor member 18 may become partially embedded in the inner face 50 of the surface 44, thereby further ensuring that the anchor member 18 will not rotate as the threaded shank 16 advances through the transition point 32. The first threaded segment 40 with its larger major diameter prevents the anchor member 18 from pulling free of the threaded shank 16 as the withdrawal force is applied to the fastener 12 in seeking to bring the anchor member 18 to bear upon the inner face 50 of the penetrable surface 44.

The multi-segmented thread arrangement of the fastener 12 provides an additional advantage. Threaded fasteners having a single thread size extending along a shank require an increasing drive torque to advance into a material as more threads engage the material. There is no upper limit to the drive torque; an infinitely long threaded shank would ultimately require infinite driving torque. The first threaded segment 40 of the fastener 12 of the present invention limits the driving torque required to drive the fastener 12 into a material. The level of the maximum driving torque required to fully embed the fastener 12 in a material is increased as the major diameter of the first threaded segment 40 is increased; increasing the length of the first threaded segment 40 will also increase the maximum driving torque. The threads of the second threaded segment 42 will engage some material and thereby contribute somewhat to increasing pull-out resistance of the fastener 12, but will not contribute significantly to driving torque requirements. The second threaded segment 42 may be established with a different pitch than the pitch of the first threaded segment 40. In such an arrangement the threads of the second threaded segment 42 will engage material displaced by the first threaded segment 40 to a significant degree with a cross-threading-like action, thereby further increasing the pull-out resistance of the fastener 12. The additional thread engagement by the second threaded segment 42 thus realized will only nominally increase drive torque requirements as the second threaded segment 42 is increasingly threadedly advanced into a material.

Referring to FIG. 5, it may be seen that when a wooden member 52 is located behind the penetrable surface 44, the anchor member 18 is partially embedded in the wooden member 52 when the fastener 12 is driven fully home against the retaining means 20 and the article 46.

An alternative embodiment of the present invention is shown in FIG. 7. In this alternative embodiment, the threaded fastener 54 is headless, thereby providing a stud for attachment of a threaded article to a surface, such as a hook. The anchor assembly 18 and the retaining means 20 remain substantially the same in the alternative embodiment shown in FIG. 7 as has been hereinbefore described.

It is to be understood that, while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

What is claimed:

1. A fastener assembly for attaching articles to a penetrable surface comprising a threaded fastener having a threaded shank and an anchor member piercedly capturing said threaded shank, said anchor member lying in a first position substantially parallel to the axis of said threaded shank and partially embracing said threaded shank while said fastener, carrying said anchor member, pierces said surface, said threaded shank having a length sufficiently greater than the length of said anchor member to allow said threaded shank to extend beyond both ends of said anchor member when said anchor member is in said first position; said anchor member further having spring means for aiding rotation of said anchor member from said first position after said anchor member has passed fully through said surface to a second position substantially oblique to the axis of said threaded shank; said threaded shank having at least two thread segments of different major diameters with the thread segment having the largest major diameter being first to pierce said surface during installation of the fastener assembly whereby when said fastener is subjected to a force in a direction to retract said fastener through said surface after said anchor member has rotated toward said second position and said anchor member is brought to bear against said surface, thereby positioning said fastener to be threadedly advanced through said anchor member, said threaded shank will be prevented, by said larger major diameter threaded segment bearing against said anchor member, from pulling through said anchor member and allowing said anchor member to fall free.

2. A fastener assembly as recited in claim 1 further including retaining means for keeping said anchor member in said first position until said anchor member has passed fully through said surface.

3. A fastener assembly as recited in claim 2 wherein said retaining means is a washer which surrounds said anchor member and said threaded fastener and keeps said anchor member in said first position until said washer is pushed from engagement with said anchor member by said surface as the assembly penetrates said surface.

4. A fastener assembly for attaching articles to a penetrable surface comprising a headed threaded fastener having a head and a threaded shank, an anchor member piercedly capturing said threaded shank, and a retaining means for holding said anchor member in a first position lying substantially parallel to the axis of said threaded shank and partially embracing said threaded shank while said fastener, carrying said anchor member pierces said surface, said threaded shank having a length sufficiently greater than the length of said anchor member to allow said threaded shank to extend beyond both ends of said anchor member when said anchor member is in said first position; said anchor further having spring means for aiding rotation of said anchor member from said first position after said anchor member has passed fully through said surface to a second position substantially oblique to the axis of said threaded shank; said threaded shank having at least two thread segments of different major diameters with the thread segment having the largest major diameter being most distal from the head of said fastener whereby when said fastener is subjected to a force in a direction to retract said fastener through said surface after said anchor member has rotated toward said second position and said anchor member is brought to bear against said surface, thereby positioning said fastener to be threadedly advanced through said anchor member, said threaded shank will be prevented, by said larger major diameter threaded segment bearing against said anchor member, from pulling through said anchor member and allowing said anchor member to fall free.

5. A fastener assembly as recited claim 1 or claim 4 wherein said spring means comprises a finger stamped in said anchor member and remaining an integral part thereof.

* * * * *